(12) United States Patent
Dai et al.

(10) Patent No.: US 8,769,126 B2
(45) Date of Patent: Jul. 1, 2014

(54) EXPANDED MEMBERSHIP ACCESS CONTROL IN A COLLABORATIVE ENVIRONMENT

(75) Inventors: Hong Dai, Westford, MA (US); Michael Anthony Dempsey, Arlington, MA (US); Joseph Anthony Russo, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1470 days.

(21) Appl. No.: 10/875,970

(22) Filed: Jun. 24, 2004

(65) Prior Publication Data
US 2005/0289234 A1 Dec. 29, 2005

(51) Int. Cl.
*G06F 15/16* (2006.01)

(52) U.S. Cl.
USPC ............... 709/229; 726/4; 726/21; 726/28

(58) Field of Classification Search
USPC ............... 709/229, 223, 205; 707/100
See application file for complete search history.

(56) References Cited

U.S. PATENT DOCUMENTS 6,651,096 B1 * 11/2003 Gai et al. .............. 709/223
2003/0126137 A1 * 7/2003 McFadden ............ 707/100

OTHER PUBLICATIONS

"LDAP & Group Information", (http://www.doit.wisc.edu/middleware/ldap/ldap_groups.asp, retrieved via the internet archives with a publication date of May 8, 2003).*

"Going more (Quick)Places", Tara Hall, (http://www.ibm.com/developerworks/lotus/library/ls-MoreQP/index.html), Aug. 1, 2002.*

*Managing Groups in LDAP*, New Architect, Mark Wilcox, http://www.webtechniques.com/archives/200/05wilcox, <Visited Jun. 15, 2004>.

*QuickPlace Authentication Architecture and Troubleshooting Part 2*, LDD Today, Joe Russo, http:/www.10.lotus.com/ldd/today.nsf/DisplayForm/D472EADA679B59DB85256D1600466328?OpenDocment, <Visited Jun. 13, 2004>.

*QuickPlace Authentication Architecture and Troubleshooting Part 1*, LDD Today, Joe Russo, http:/www.10.lotus.com/ldd/today.nsf/DisplayForm/B78B160DC588CA0D85256CF500715000?OpenDocument, <Visited Jun. 13, 2004>.

* cited by examiner

*Primary Examiner* — Dustin Nguyen
(74) *Attorney, Agent, or Firm* — Steven M. Greenberg, Esq.; CRGO Law

(57) ABSTRACT

A method, system and apparatus for expanded membership access control in a collaborative environment. A collaborative application which has been configured for expanded membership access control can include a collaborative space configured to host places, and rooms and sub-rooms within the places. The collaborative space further can include a membership management processor coupled to the collaborative space and programmed both to produce access control lists for the rooms and sub-rooms based upon specified roles for members and to assign the roles to members added to the rooms and sub-rooms separately from the access control lists. Notably, a membership directory also can be included which can be configured to store membership information for the members exclusive of the access control lists.

21 Claims, 2 Drawing Sheets

EXPANDED MEMBERSHIP ACCESS CONTROL IN A COLLABORATIVE ENVIRONMENT

BACKGROUND OF THE INVENTION

1. Statement of the Technical Field

The present invention relates to collaborative computing, and more particularly to access control for members of a collaborative community.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. These technologies include document libraries, instant messaging, chat rooms, and application sharing.

Conventional collaborative computing includes combinations of collaborative technologies in order to provide a means for members of a collaborative community to pool their strengths and experiences to achieve a common goal. For instance, a common goal can include an educational objective, the completion of a software development project or even the creation and use of a system to manage human resources. A collaborative computing community generally can be defined by (1) a particular context, i.e. the objective of the environment, (2) membership, i.e., the participants in the environment, (3) a set of roles for the members, and (4) resources and tools which can be accessed by the membership in furtherance of the objective of the environment. Roles are names given to the people in the environment which dictate access to the resources and tools within the environment as well as define the behavior of the community members.

In the traditional membership model for a collaborative application, access control lists include the names of members in the collaborative application. In one type of collaborative environment, a collaborative space or "place" can be established to include one or more "rooms". Each room can have an access control list (ACL) which is a subset of a parent rooms ACL which ultimately is a subset of the ACL for the place. Consequently, the ACL can be the same as a list of all members for the place. As such, as the membership list grows, so too will the ACL grow. Yet, in many collaborative computing environments—particularly those environments dependant upon an underlying database management system, the ACL can be space limited to conserve computing resources in the database management system.

By virtue of the tight coupling between the membership list and the ACL, managing the ACL can be complicated, especially where a place is defined by several nested levels of rooms associated with different members having different rights within the rooms. Whenever a user entry is to change in the underlying database management system, the change also must be reflected in each ACL throughout a place. As a result, a simple modification or deletion of a name from a membership directory can have far reaching consequences through the place as each ACL must be programmatically modified to incorporate the change. Of course, the programmatic harmonization of multiple ACLs in a place with a membership directory can be resource consumptive to say the least.

SUMMARY OF THE INVENTION

The present invention addresses the deficiencies of the art in respect to access control in a collaborative space and provides a novel and non-obvious method, system and apparatus for expanded membership access control in a collaborative application. In this regard, a collaborative application which has been configured in accordance with the present invention can include a collaborative space configured to host places, and rooms and sub-rooms within the places. The collaborative space further can include a membership management processor coupled to the collaborative space and programmed both to produce access control lists for the rooms and sub-rooms based upon specified roles for members and to assign the roles to members added to the rooms and sub-rooms separately from the access control lists. Notably, a membership directory also can be included which can be configured to store membership information for the members exclusive of the access control lists.

The collaborative application can include a hierarchical directory configured to store the access control lists. The hierarchical directory further can be configured to store groups of directory entries for members added to a specific one of the rooms and sub-rooms, based upon a specified role for the members. Preferably, the hierarchical directory can be an LDAP directory. By comparison, the membership directory further can include one or more fields configured to accept a listing of rooms, each of the fields specifying a particular role for a member who has been added to a listed one of the rooms. Notably, the specified roles can include readers, managers and authors.

A method for managing expanded membership access control in a collaborative application can include the steps of adding a room to a place through the collaborative application, creating a set of roles in an ACL for the added room, and further creating a set of corresponding groups for the roles. A member can be added to the added room and one of the roles can be assigned to the added member. Subsequently, a directory entry can be written in a group corresponding to the assigned one of the roles. Moreover, a database entry can be written for the added member indicating the added room and the assigned one of the roles. In consequence, access to the added room by an accessing member can be limited by looking up a group membership for the accessing member, matching the group membership to a role and applying role-based permissions indicated by the ACL.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for expanded membership management in a collaborative environment. In accordance with the present invention, the one-to-one direct correlation between a membership directory and an ACL can be decoupled to permit an expanded membership model. Specifically, each room and sub-room in a place within the collaborative environment can be configured with an ACL specifying access types rather than specific users having an access type. A separate hierarchical directory can record users who are members of particular rooms and sub-rooms which users have a specific access type for the particular rooms and sub-rooms. Finally, the membership directory itself can include a listing of the users and the rooms and sub-rooms to which the users belong having a particular access type. As such, modifications to the list can be limited to the hierarchical directory and the membership directory, while the ACL for any one room or sub-room can remain unscathed.

Figure 1:
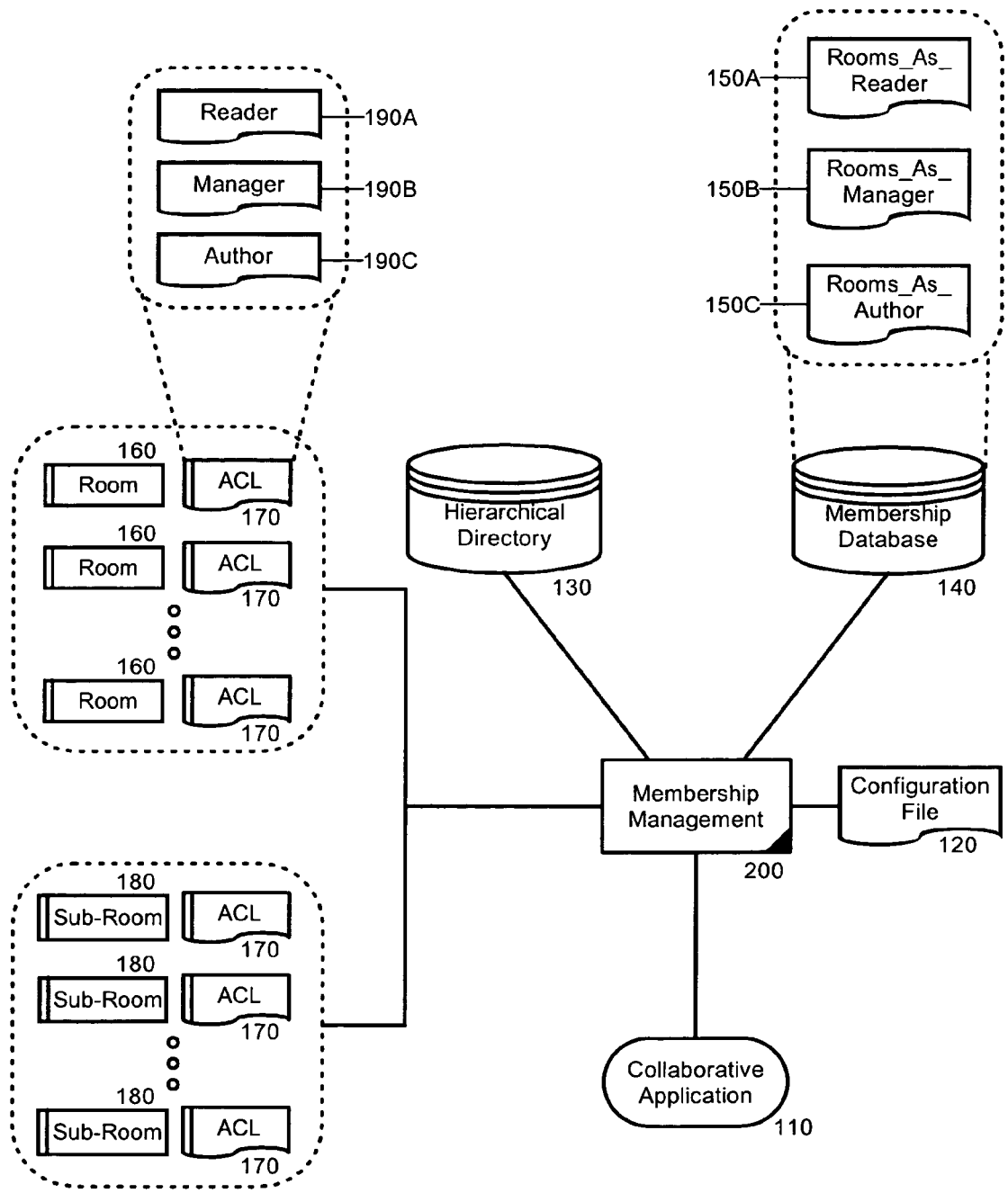
FIG. 1 is a schematic illustration of a collaborative application configured for expanded membership processing in accordance with the inventive arrangements; and, FIG. 2 is a flow chart illustrating a process for managing room and sub-room members in a collaborative environment according to an expanded membership model implemented in the system of FIG. 1.

In more particular illustration, FIG. 1 is a schematic illustration of a collaborative application configured for expanded membership processing in accordance with the inventive arrangements. The collaborative application 110 can be coupled to or can include a membership management process 200 programmed to manage the association of external users with rooms 180 and sub-rooms 160 defined within in the collaborative application. In this regard, the membership management process 200 can manage both the addition to and also the removal from the rooms 180 and sub-rooms 160 of the external users.

Each room 160 and sub-room 180 can include a corresponding ACL 170 defined to be room-specific within a hierarchical directory 130 such as an LDAP directory. The ACL 170 can provide role-based permissions rather than individual permissions associated with conventional ACL usages in respect to collaborative computing applications. For instance, in a preferred aspect of the invention, the roles 190A, 190B, 190C can include that of a reader 190A (a reader of content in the room or sub-room), an author 190C (one with rights to create content for placement in the room or sub-room), and a manager 190B (one with administrative rights in the room or sub-room).

Importantly, individual users assigned to a room 160 or sub-room 180 can be specified as having one of the roles 190A, 190B, 190C through an entry in the hierarchical directory 130. Preferably, each time a room 160 or sub-room 180 is created, an ACL 170 for the room 160 or sub-room 180 can be created in the hierarchical directory 130 having groupings for the defined roles 190A, 190B, 190C. Basic information for creating the ACL 170 can be obtained from a configuration file 120, including, for example the base distinguished name required for composing an entry in the ACL 170 and the hierarchical directory 130. Preferably, the ACL 170 entry can include a common name denoting the role 190A, 190B, 190C, an organizational unit specifying the room 160 or sub-room 180, an organizational unit specifying the place name, and a base distinguished name for the collaborative application 110.

As users are added to a room 160 or sub-room 180, an entry can be written to the hierarchical directory 130 under a grouping for the room 160 or sub-room 180 associated with the role 190A, 190B, 190C assigned to the user. Conversely, as users are removed from a room 160 or sub-room 180, an existing entry can be removed from the hierarchical directory 130 under a grouping for the room 160 or sub-room 180 associated with the role 190A, 190B, 190C assigned to the user. Moreover, as each room 160 and sub-room 180 is removed within the collaborative application 110, all entries for the corresponding users, regardless of the role, can be removed from the hierarchical directory 130.

A membership directory 140 further can be coupled to the membership management process 200. The membership directory 140 can store member records not required for determining access permissions in a room 160 or sub-room 180. Rather, the information required for determining access permissions in a room 160 or sub-room 180 can remain with the roles 190A, 190B, 190C defined in the ACL 170 and the directory entries for the users stored in the hierarchical directory 130. The member records, then, can include basic information for a member of the collaborative application 110, or for a user created for a specific room 160 or sub-room 180 in a place within the collaborative application 110. The basic information can include, for example, information utilized by the collaborative application 110 to facilitate the participation of a member in collaborative operations such as e-mail notifications, task assignments, workflow and so forth.

Importantly, the membership directory can include one or more fields in each record entry for a member which specify the roles 190A, 190B, 190C enjoyed by the member for different rooms 160 and sub-rooms 180 in the collaborative application 110. For instance, in the case where three roles have been defined—reader 190A, manager 190B and author 190C, three fields can be added to the membership directory 140: rooms_as_reader 150A, rooms_as_manager 150B, and rooms_as_author 150C. Each field can include a listing of zero or more rooms 160 or sub-rooms 180 in which the associated member enjoys a role 190A, 190B, 190C associated with the field. In this way, the permissions associated with a user for a particular room 160 or sub-room 180 can be determined either through a query to the hierarchical database 130, or through a query to the membership directory 140. In this regard, it is an advantage of the present arrangement that the membership directory 140 can be accessed so as to perform authentication even when the collaborative application 110 goes offline. Specifically, in a preferred implementation, the membership directory 140 can be local to the collaborative application 110, while the hierarchical directory 130 can operate in server remote to the server hosting the collaborative application 110.

Figure 2:
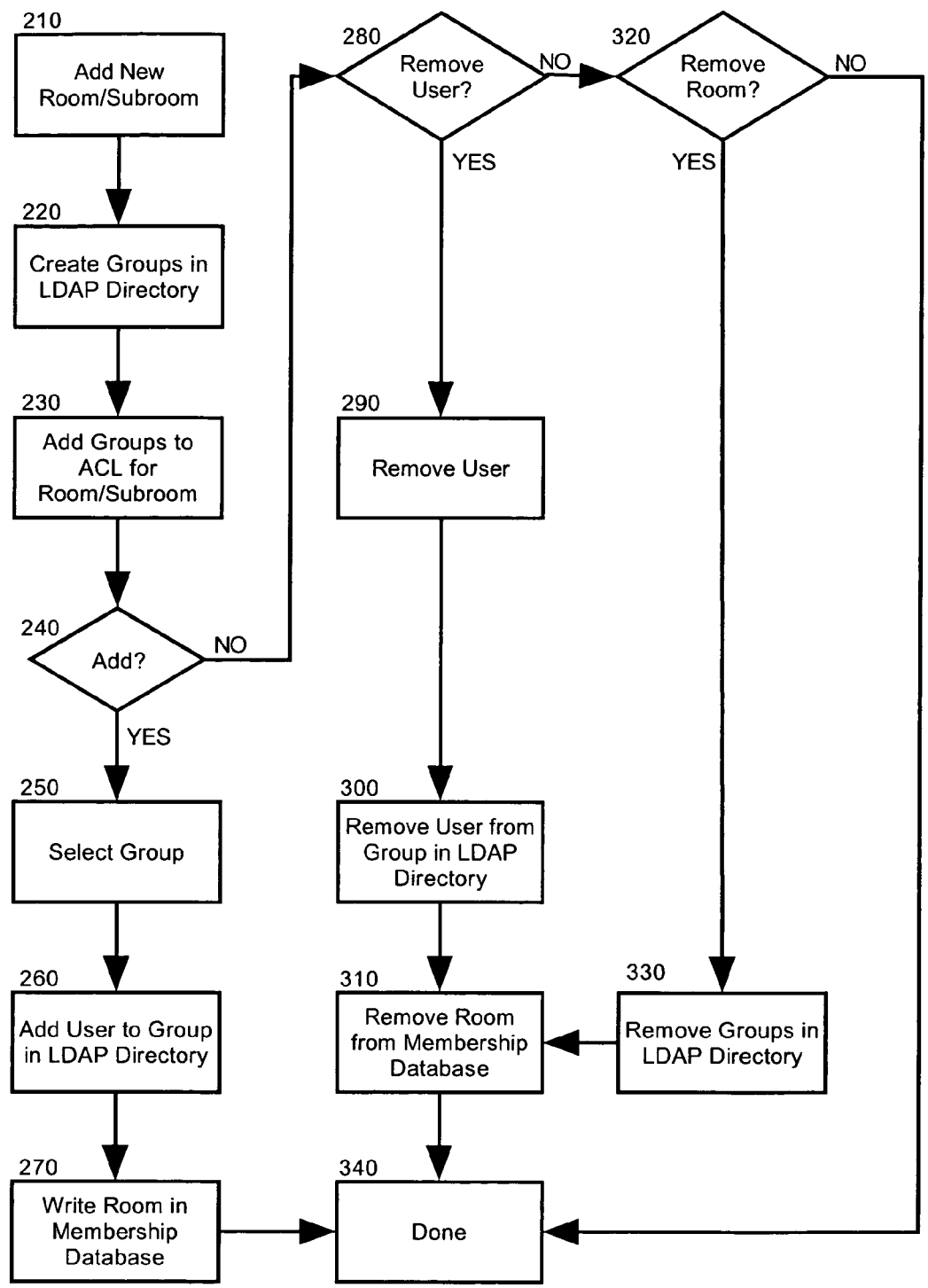

Once rooms 160 and sub-rooms 180 have been added to a place through the operation of the collaborative application 110, membership in the rooms 160 and sub-rooms 180 can be managed through the operation of the membership management process 200. In further illustration, FIG. 2 is a flow chart illustrating a process for managing room and sub-room members in a collaborative environment according to an expanded membership model implemented in the system of FIG. 1. Beginning in block 210, new rooms or sub-rooms can be added to the place. In block 220 one or more groups can be defined for roles to be applied to the different rooms and sub-rooms of the place. In block 230, an ACL for the added rooms or sub-rooms can be created to specify access rights for different members. Accordingly, specified users in the groups can access the rooms and sub-rooms on a basis accorded to the users by the roles associated with the groups.

In decision block 240, it can be determined whether or not to add a member to a room or sub-room, and in decision block 280 it can be determined whether or not to remover a member from a room or sub-room. In the circumstance where a member is to be added to a room or sub-room, in block 250 a group can be selected for the member which corresponds to the intended role to be assigned to the member. In block 260 the member can be added to the room and group in the hierarchical directory. Finally, in block 270, the room or sub-room to which the member has been added can be written to the membership directory in a field indicating the appropriate role.

Conversely, if in decision block 280 it is determined that a member is to be removed from a room, in block 290 the member can be removed from the membership database and in block 300, the member can be removed from the group in the hierarchical directory. Also, in block 310 the room reference for the member can be removed from the membership database. Finally, in decision block 320, if it is determined that the room is to be removed from the collaborative application, in block 330 the groups relating to the room can be removed from the hierarchical directory and in block 310 all references to the room in the membership directory can be removed. As such, in block 340 the process can end.

Notably, several advantages can be obtained through the operation of the foregoing process and through the arrangement of the foregoing system. First, to the extent that accessing a membership directory is substantially quicker than performing a lookup operation in a hierarchical directory, resolving roles within particular rooms for individual users in the membership directory rather than the hierarchical directory can produce important processing advantages. Moreover, this allows the collaborative application to operate even when the application goes offline because the membership directory can be local to the application. Most importantly, however, the ACL for the rooms can be decoupled from the membership directory so as to facilitate the management of members in the collaborative application and so as to remove resource limitations associated with space limits of an ACL.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for managing expanded membership access control in a collaborative application, the method comprising the steps of:
    adding a room to a place through the collaborative application;
    creating a set of roles in an access control list (ACL) in a hierarchical directory for said added room, and further creating a set of corresponding groups for said roles in the hierarchical directory;
    adding a member to a membership directory that is separate from the hierarchical directory; and,
    additionally adding the member to said added room and assigning one of said roles in the ACL to said added member by writing a directory entry in the hierarchical directory in a group corresponding to said assigned one of said roles after said assigned one of said roles has been assigned to said added member.

2. The method of claim 1, wherein the membership directory comprises one or more fields in each record entry for the added member which specify corresponding roles assigned to the added member for different rooms and sub-rooms in the collaborative application.

3. The method of claim 1, further comprising the step of limiting access to said added room by an accessing member by looking up a group membership for said accessing member in the hierarchical directory, matching said group membership to a role and applying role-based permissions indicated by said ACL.

4. The method of claim 2, further comprising the step of determining role based permissions for a particular member by inspecting a record entry for said particular member to identify said assigned one of said roles for an indicated room.

5. The method of claim 4, further comprising the step of performing the determining step while the collaborative application is off-line.

6. The method of claim 1, further comprising the step of removing said added member from said added room by deleting said record entry.

7. The method of claim 6, wherein said removing step further comprises the step of deleting said record entry for said added member.

8. A collaborative application, comprising:
    a collaborative space configured to host places, and rooms and sub-rooms within said places in a computer having at least one processor and memory; and,
    a membership management processor executing in memory of the computer and coupled to the collaborative space, the membership management processor programmed to add a room to a place through the collaborative application, to create a set of roles in an access control list (ACL) in a hierarchical directory for said added room and to further create a set of corresponding groups for said roles in the hierarchical directory, to add a member to a membership directory that is separate from the hierarchical directory, and to additionally add the member to said added room and assigning one of said roles in the ACL to said added member by writing a directory entry in the hierarchical directory in a group corresponding to said assigned one of said roles after said assigned one of said roles has been assigned to said added member.

9. The collaborative application of claim 8, wherein the membership directory comprises one or more fields in each record entry for the added member which specifies corresponding roles assigned to the added member for different rooms and sub-rooms in the collaborative application.

10. The collaborative application of claim 8, wherein the membership management processor is further programmed to limit access to said added room by an accessing member by looking up a group membership for said accessing member in the hierarchical directory, matching said group membership to a role and applying role-based permissions indicated by said ACL.

11. The collaborative application of claim 9, wherein the membership management processor is further programmed to determine role based permissions for a particular member by inspecting a record entry for said particular member to identify said assigned one of said roles for an indicated room.

12. The collaborative application of claim 8, wherein said hierarchical directory is an LDAP directory.

13. The collaborative application of claim 8, wherein the set of roles comprises readers, managers, and authors.

14. The collaborative application of claim 8, wherein the membership management processor is further programmed to remove said added member from said added room by deleting said record entry.

15. A computer program product comprising a computer usable storage memory having computer usable program code for catalog display, said computer program product including:
    computer usable program code for adding a room to a place through the collaborative application;
    computer usable program code for creating a set of roles in an access control list (ACL) in a hierarchical directory for said added room, and further creating a set of corresponding groups for said roles in the hierarchical directory;
    computer usable program code for adding a member to a membership directory that is separate from the hierarchical directory; and,
    computer usable program code for additionally adding the member to said added room and assigning one of said roles in the ACL to said added member by writing a directory entry in the hierarchical directory in a group corresponding to said assigned one of said roles after said assigned one of said roles has been assigned to said added member.

16. The computer program product of claim 15, wherein the membership directory comprises one or more fields in each record entry for the added member which specifies corresponding roles assigned to the added member for different rooms and sub-rooms in the collaborative application.

17. The computer program product of claim 15, further comprising computer usable program code for limiting access to said added room by an accessing member by looking up a group membership for said accessing member in the hierarchical directory, matching said group membership to a role and applying role-based permissions indicated by said ACL.

18. The computer program product of claim 16, further comprising computer usable program code for determining role based permissions for a particular member by inspecting a record entry for said particular member to identify said assigned one of said roles for an indicated room.

19. The computer program product of claim 18, further comprising computer usable program code for performing the determining step while the collaborative application is off-line.

20. The computer program product of claim 15, further comprising computer usable program code for removing said added member from said added room by deleting said record entry.

21. The computer program product of claim 20, wherein computer usable program code for removing said added member from said added room by deleting said record entry further comprises computer usable program code for deleting said record entry for said added member.

* * * * *